US006730713B2

(12) United States Patent
Czaplicki

(10) Patent No.: US 6,730,713 B2
(45) Date of Patent: May 4, 2004

(54) CREATION OF EPOXY-BASED FOAM-IN-PLACE MATERIAL USING ENCAPSULATED METAL CARBONATE

(75) Inventor: Michael J. Czaplicki, Rochester, MI (US)

(73) Assignee: L&L Products, Inc., Romeo, MI (US)

( * ) Notice: Subject to any disclaimer, the term of this patent is extended or adjusted under 35 U.S.C. 154(b) by 66 days.

(21) Appl. No.: 10/212,524

(22) Filed: Aug. 5, 2002

(65) Prior Publication Data

US 2003/0060523 A1 Mar. 27, 2003

Related U.S. Application Data

(60) Provisional application No. 60/324,495, filed on Sep. 24, 2001.

(51) Int. Cl.$^7$ .................................................. C08J 9/08
(52) U.S. Cl. ........................... 521/76; 521/85; 521/92; 521/97; 521/98; 521/106; 521/123; 521/130; 521/132; 521/135; 521/178; 523/218; 523/219
(58) Field of Search ............................ 521/85, 92, 97, 521/98, 106, 123, 130, 132, 135, 178, 76; 523/218, 219

(56) References Cited

U.S. PATENT DOCUMENTS

| | | |
|---|---|---|
| 4,427,481 A | 1/1984 | Smith et al. |
| 4,538,380 A | 9/1985 | Colliander |
| 4,693,775 A | 9/1987 | Harrison et al. |
| 4,724,243 A | 2/1988 | Harrison |
| 4,749,434 A | 6/1988 | Harrison |
| 4,769,166 A | 9/1988 | Harrison |
| 4,922,596 A | 5/1990 | Wycech |
| 4,923,902 A | 5/1990 | Wycech |
| 4,978,562 A | 12/1990 | Wycech |
| 5,124,186 A | 6/1992 | Wycech |
| 5,648,401 A | 7/1997 | Czaplicki et al. |
| 5,712,317 A | 1/1998 | Makhlouf et al. |
| 5,884,960 A | 3/1999 | Wycech |
| 5,932,680 A | 8/1999 | Heider |
| 5,948,508 A | 9/1999 | Pastore et al. |
| 5,964,979 A | 10/1999 | George et al. |
| 5,985,435 A | 11/1999 | Czaplicki et al. |
| 5,994,422 A | 11/1999 | Born et al. |
| 6,004,425 A | 12/1999 | Born et al. |
| 6,030,701 A | 2/2000 | Johnson et al. |
| 6,040,350 A | 3/2000 | Fukui |
| 6,057,382 A | 5/2000 | Karim et al. |
| 6,077,884 A | 6/2000 | Hess et al. |
| 6,096,791 A | 8/2000 | Born et al. |
| 6,133,335 A | 10/2000 | Mahoney et al. |
| 6,136,398 A | 10/2000 | Willett et al. |
| 6,153,302 A | 11/2000 | Karim et al. |
| 6,174,932 B1 | 1/2001 | Pachl et al. |
| 6,218,442 B1 | 4/2001 | Hilborn et al. |
| 6,228,449 B1 | 5/2001 | Meyer |
| 6,263,635 B1 | 7/2001 | Czaplicki |
| 6,277,898 B1 | 8/2001 | Pachl et al. |
| 6,287,669 B1 | 9/2001 | George et al. |
| 6,312,668 B2 | 11/2001 | Mitra et al. |
| 6,348,513 B1 | 2/2002 | Hilborn et al. |
| 6,350,791 B1 | 2/2002 | Feichtmeier et al. |
| 6,376,564 B1 | 4/2002 | Harrison |
| 6,419,305 B1 | 7/2002 | Larsen |

FOREIGN PATENT DOCUMENTS

| | | |
|---|---|---|
| WO | WO 99/02578 | 1/1999 |
| WO | WO 01/57130 | 8/2001 |

OTHER PUBLICATIONS

"The Epoxy Book", A System Three Resins Publication, pp. 1–41, System Three Resins, Inc., Seattle, Washington.
"Epoxy Resins", Second Edition Encyclopedia of Polymer Science and Engineering, vol. 6, pp. 322–382, 1985.
Copending application Ser. No. 09/847,252 filed May 2, 2001.
Copending application Ser. No. 09/923,138 filed Aug. 6, 2001 (formerly Provisional application Ser. No. 60/223, 667).
Copending application Ser. No. 09/858,939 filed May 16, 2001 (formerly Provisional application Ser. No. 60/225, 126).
Copending application Ser. No. 09/502,686 filed Feb. 11, 2000.
Copending application Ser. No. 09/459,756 filed Dec. 10, 1999.
Copending application Ser. No. 09/676,335 filed Sep. 29, 2000.
Copending application Ser. No. 09/676,725 filed Sep. 29, 2000.
Copending application Ser. No. 09/524,961 filed Mar. 14, 2000.
Copending application Ser. No. 09/939,245 filed Aug. 24, 2001.
Copending application Ser. No. 10/119,446 filed Apr. 10, 2002.

*Primary Examiner*—Morton Foelak
(74) *Attorney, Agent, or Firm*—Dobrusin & Thennisch PC

(57) ABSTRACT

The invention and formulation relates to methods, materials, and products for foam-in-place materials comprising a two-component foam-in-place structural material for producing a foamed product. A first component of the system includes an epoxy-based resin preferably formulated with a coated particles, such as a metal salt, a metal carbonate encapsulated within a wax, or a polymer, (e.g., Thermoset, thermoplastic, or mixture). The metal carbonate particle may be encapsulated within a wax, shell or skin that will change state to expose the core to chemically react for initiating the production of gas for blowing. The second component is an acid that is capable of initiating polymerization of the resin. A reactive mixture is achieved through the combination of the first and second components wherein heat from the exothermic reaction of the acid with the epoxy component causes the thermoplastic shell, skin, or wax encapsulating a metal carbonate core to soften or melt thereby exposing the metal carbonate to the reactive mixture.

17 Claims, No Drawings

CREATION OF EPOXY-BASED FOAM-IN-PLACE MATERIAL USING ENCAPSULATED METAL CARBONATE

This application claims the benefit of U.S. Provisional Application No. 60/324,495 filed on Sep. 24, 2001.

FIELD OF THE INVENTION

The present invention relates generally to foam-in-place materials. More particularly, the present invention relates to formulations and methods of making foamed synthetic polymers which exhibit enhanced mechanical properties, such as increased stiffness and rigidity in reinforcement application, improved adhesion to metallic substrates, and maintaining control over the reactive mixture and attendant foaming characteristics of the foam-in-place material.

BACKGROUND OF THE INVENTION

Traditional foam-in-place structural materials known in the art generally disclose polyurethane materials and epoxy-based materials with or without a blowing agent. For example, commonly assigned U.S. Pat. No. 5,648,401 for Foamed Articles And Methods Of Making Same, which is hereby expressly incorporated by reference, teaches a three-ingredient foam-in-place structural material. Although these prior art materials are both useful and successful in a number of applications, certain structural reinforcement applications in the automotive industry require a material having improved mechanical properties, such as increased stiffness, improved adhesion to metallic substrates, and little reduction in modulus or glass temperature as exposure temperature is increased. In addition, specific reinforcement applications require a greater degree of control over the reactive mixture with potentially increased localized foaming in certain areas.

As known by those skilled in the art, a number of factors determine the suitability of a process for forming a foamed product of the type in which a blowing agent forms cells in a synthetic resin as the resin is cured. Most significantly, the interaction of the rate of cure and the rate at which the blowing gas is generated must be such that the correct foam volume is attained. If the resin cures too rapidly there is inadequate time for the gas to form the proper size and number of gas voids in the finished product. Over expansion of the forming foam product must also be avoided. Rapid expansion due to a slow cure rate may cause the expanding foam to simply collapse as a result of inadequate wall strength surrounding the individual gas cells.

Generally speaking, foamed products must have good stability when exposed to various environmental conditions and, most significantly, in many applications they must protect metal from corrosion when exposed to hostile environmental conditions. This is particularly true in automotive applications where the foamed product can be utilized and placed within portions of the vehicle that are routinely exposed to hostile environmental conditions, ambient temperature and weather fluctuations, as well as structural stress and strain.

In the past, many foamed parts were made using polyurethane which provides a number of desirable attributes. It is known, however, that alternatives to urethane-based or urea-based foams are frequently more environmentally desirable. Such environmental concerns relate to material handling during manufacturing as well as waste management concerns, in part due to unreacted functional groups in the finished products and difficulty in handling isocyanate functional chemicals in manufacturing processes.

Accordingly, there is a need in industry and manufacturing operations for a structural material which exhibits improved mechanical properties and which may be formulated to provide a directed and controlled reactive mixture to produce the foam-in-place material. The present invention addresses and overcomes the shortcomings found in the prior art by providing a first epoxy component formulated with a metal carbonate encapsulated by a polymer or thermoplastic shell or skin. A second component consisting of a strong acid is then combined with the first epoxy component in a reactive mixture to produce a foam-in-place material which demonstrates good adhesion to metallic substrates, resistance to high humidity or corrosive environments, and resistance to high temperature exposure when compared to other epoxy-based materials known in the art. In addition, the encapsulated metal carbonate core can serve to control and effect the reaction rate and characteristics of the reactive mixture as a function of the selected material, melting point, thickness, texture, particle size, and percentage by weight of the selected core as well as the percentage of acid used in the formulation.

SUMMARY OF THE INVENTION

The present invention relates to methods, materials, and products for foam-in-place materials. In one embodiment, the present invention comprises a two-component foam-in-place structural material for producing a foamed product. Though other resin systems are possible, the first component of the system includes an epoxy-based resin. Preferably, the first component is formulated with coated particles. Although the preferred particle is a metal salt, such a metal carbonate encapsulated within a wax, polymer, (e.g., Thermoset, thermoplastic, or mixture) a number of materials and encapsulation means may be used. In a preferred embodiment, a metal carbonate particle is encapsulated within a wax, shell or skin that will change state to expose the core to chemically react for initiating the production of gas for blowing. For example, the shell is a thermoplastic that, upon heating, will melt or soften to expose the surface of a metal carbonate core. It is contemplated that the thermoplastic shell having a metal carbonate core may further comprise a blowing agent formulated with or separately form the epoxy resin, and preferably used together as a first component. The second component is an acid that is capable of initiating polymerization of the resin. A reactive mixture is achieved through the combination of the first and second components wherein heat from the exothermic reaction of the acid with the epoxy component causes the thermoplastic shell, skin, or wax encapsulating a metal carbonate core to soften or melt thereby exposing the metal carbonate to the reactive mixture. The introduction of the acid with the metal carbonate-filled polymer particles results in a reaction between the metal carbonate and acid resulting in gas release. The resulting temperature achieved in the reactive mixture prior to particle exposure is somewhat dependent on the type of particle used to create the initial metal carbonate particle found in the epoxy as well as the type and characteristics of metal carbonate that is encapsulated within the thermoplastic shell, skin, or wax. It is contemplated that the reaction or reactive mixture of the epoxy component with the acid can be controlled and directed through the type, characteristics, and properties of the core selected to be encapsulated and formulated within the epoxy component. For example, the coating on the metal carbonate (for illustrative purposes, a metal carbonate) can have a varying melting point, or varying coating thickness. The percentage of metal carbonate in the formulation, size of metal carbonate particles, and percentage of acid strength and type of acid used in the formulation can be varied as well. All of these factors can effect the timing, characteristics, and foaming of the reactive mixture. As the homopolymerization exothermic reaction continues, the particles react and create gas thereby producing a foam-in-place material as the epoxy component cures.

The present invention provides a method of forming a foamed product which comprises the steps of combining the first component (e.g., with the metal carbonate core and meltable skin) with the second or acid component (which may, but not necessarily, comprise a curing agent depending upon the specific application). The first component, preferably an epoxy, is cross-linked through a polymerization reaction which advantageously may be catalyzed by the second component (e.g. the acid). In this regard, an exothermic reaction or reactive mixture is created between the epoxy component and the acid component when combined. The heat generated by the exothermic reaction softens the thermoplastic shell, skin, or wax encapsulating the configured core, or otherwise exposes the core to the acid. A gas releasing chemical reaction may then ensue. Thus, in one embodiment, as the thermoplastic shell with the metal carbonate core softens from the heat, gas is generated to create expansion. Simultaneously, a curing reaction occurs by the reaction of the epoxy component catalyzed by the acid component. In a preferred embodiment the mixture of materials is in liquid form. However, it is contemplated that the mixture of materials could also comprise a paste or solids of varying viscosities and textures.

In another aspect of the invention a foamed product is provided which comprises the steps of combining an epoxy resin component (formulated with the encapsulated core) with the acid component, which serves as the curing agent, and allowing the acid component formulation to cross-link the resin and react with the core formulated within the epoxy. It is contemplated that the exothermic reaction generated by the combination of the epoxy component formulation and the acid component formulation will enable the epoxy to react with the encapsulated metal carbonate to create a cell-forming gas thereby yielding the foam-in-place structural material.

DETAILED DESCRIPTION OF THE INVENTION

As used herein, all concentrations shall be expressed as percentages by weight unless otherwise specified. As used herein, the term "epoxy resin" shall be defined as a thermosetting resin based on the reactivity of the epoxide group. As used herein "polymerization" shall include, without limitation, the polymerization of monomers or prepolymers. As used herein "phosphoric acid or derivatives" shall include not only phosphoric acid but also esters of phosphoric acid and other derivatives which can produce the acid catalyzed polymerization as described herein.

The present invention relates generally to a structural foam-in-place material and method for making the same formed by cross-linking reactions between an epoxy resin and an acid component which creates a three-dimensional covalent bond network. It is contemplated that the addition of the acid component to the epoxy resin causes the resin to cure or harden into a rigidified cross-linked polymer. Cure of the foam is achieved by the reaction between the epoxy resin and the acid component which is typically exothermic and can generate a considerable amount of heat. The control of such heat and the exothermic reaction is an important consideration of the foam-in-place material of the present invention. Since the foam-in-place material of the present invention is particularly useful in the production of automobiles and other vehicles to maintain and/or increase the strength of structural members such as frame members, rails, rockers, pillars, radiator support beams, doors, hatches, reinforcing beams and the like, exothermic control prevents the charring or burning of the interior of the foam.

More particularly, the method and composition of the present invention has two main components: (1) a resin, preferably a liquid resin or epoxy resin; (2) an acid that is capable of initiating polymerization of the resin. The resin component is further defined as having a core encapsulated by a polymer or other heat fusable substance such as a substrate to create a shell or skin. In a preferred embodiment, the core consists of a salt, preferably a metal salt, and more preferably a metal carbonate encapsulated by a hydrocarbon, such as a polymer or wax. Although the core within the thermoplastic or the shell itself may further comprise an optional blowing agent formulated with the resin component, no additional curing agent or blowing agent is required in the present invention. In this regard, it is contemplated that the acid component, when combined with the resin component (having the encapsulated metal carbonate core), initiates the curing process and gas generation.

First or Resin Component

The first or resin component of the present invention is selected for its structurally adhering characteristics, potential to impart rigidity, and ability to produce flexible foams. Suitable resins may include a cross-linking polymer and, more preferably an epoxy. The properties of advantageous epoxy resins are described, for example, in the chapter entitled "Epoxy Resins" in the Second Edition of the Encyclopedia of Polymer Science and Engineering, Volume 6, pp. 322–382 (1986). The preferred epoxy resin has a number average molecular weight of from about 350 to about 600 and, on average, each molecule of epoxy has from about 1.8 to about 2.5 epoxide functional groups. The preferred epoxy resin has a viscosity of from about 5,000 to 100,000 cps (Brookfield viscosity) at 70° F. and a specific gravity of from about 1.0 to about 1.4. As stated, the preferred form of the resin is a liquid and may further comprise a high viscosity resin with relatively low reactivity. Exemplary epoxy resins which could be utilized in the present invention include polyglycidyl ethers obtained by reacting polyhydric phenols such as bisphenol A, bisphenol F, bisphenol AD, catechol, resorcinol, or polyhydric alcohols such as glycerin and polyethylene glycol with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins. Mixtures of epoxy resins may be used also in the present invention. For example, mixtures of liquid (at room temperature), semi-solid, and/or solid epoxy resins can be employed.

In a preferred embodiment, the resin of the present invention is an epoxy resin, most preferably an epoxy resin sold under the name Cardolite NC-514 by the Cardolite Company of Newark, N.J. Other commercially available resins, which may be suitable in the present application, include DER 331, DER 317, DER 337, and DER 324. The preferred epoxy resin has a number average molecular weight of from about 350 to about 600 and, on average, each molecule of epoxy has from about 1.8 to about 2.5 epoxide functional groups. The preferred epoxy resin has a viscosity of from about 10,000 to 100,000 cps (Brookfield viscosity) at 700° F. and a specific gravity of from about 1.0 to about 1.4. A resin forms from about 35 to about 95% by weight and more preferably from about 50 to about 80% by weight of the composition of the present invention.

It is contemplated that the first or resin component of the present invention described above is formulated with a core encapsulated within or otherwise retained by a wax, thermoplastic shell, or skin. Although the other thermoplastic shell, the core, or both may further comprise a blowing agent, the material or formulation of the present invention does not require the presence of a blowing agent. The core encapsulated within the thermoplastic shell is one which is capable of reacting with the preferred resin to promote a polymerization reaction that results in a controlled curing of the resin and which simultaneously reacts with the second or acid component to liberate a blowing gas. It is contemplated that the preferred core comprises a in-situ gas liberating agent such as a metal carbonate encapsulated by a wax or polymer and then mixed and formulated within the epoxy component of the present invention. The preferred metal carbonate core of the present invention is a particle or an aggregation of particles. Suitable cores for use in the present invention include alkali or alkaline earth metal salts, such as metal carbonates and metal bicarbonates and particularly preferred is calcium carbonate and anhydrous sodium bicarbonate. Since the metal carbonate core may not become part of the polymer network once cured, it is desirable to minimize the amount of metal carbonate used to maintain a degree of control and direction over the amount of foaming for the desired structural reinforcement application.

As stated above, the first or resin component of the present invention may also be formulated with a blowing agent. Because epoxies normally react with a curing agent without evolving volatiles, the addition of a blowing agent may be required to create a foamed product. The blowing agent may be a chemical agent, (i.e. one that thermally decomposes and evolves gas due to the heat of the exothermic epoxy reaction), or a physical agent, which simply vaporizes at its boiling temperature to liberate gas. In the event that a chemical blowing agent is used, particle size of the blowing agent may be adjusted so as to provide the desired foaming characteristics in the cured foam. For example, smaller particle sizes tend to provide foams having more uniform cell structure. In some alternative formulations of the present invention, it may be desirable to also use a blowing agent activator or accelerator so as to lower the temperature at which release of gas from the blowing agent takes place. Suitable blowing agent activators include, but are not limited to, ureas (such as the surface-coated, oil-treated urea sold by Uniroyal Chemicals under the trademark BIKOT) polyols, organic acids, amines, and lead, zinc, tin, calcium and cadmium oxides and salts (including carboxylic acid salts). Typically, from about 0.1% to about 2% of a blowing agent based on the weight of the foamable composition is employed, although the optimum amount will of course vary depending upon the activator/accelerator selected, the amount of blowing agent, cure temperature and other variables. An example of an optional physical blowing agent suitable for use in the present invention, is sold under the trade name Expancel 820-DU.

Second or Acid Component

The second or acid component of the present invention is an acid component may optionally include a curing agent, additive or accelerator and may enable the material to achieve modulus or glass transition temperature while still allowing significant plastic deformation following curing. The preferred acid component facilitates a cured foam-in-place material having desirable processing attributes.

The strength of the acid component is a contributing factor in calculating and controlling the latent period of the reactive mixture, hereinafter defined as the period before significant exothermic reaction and hence foaming. The latent period of the present invention can be very short, such as a few seconds, or up to thirty minutes or longer depending upon the strength of the acid and other variables. For example, the latent period can be affected and controlled by the type of core selected as well as its shell or skin properties such as by varying a melting point, coating thickness within the core, percentage of metal carbonate in the formulation, size of metal carbonate particles, and percentage of acid and type of acid used in the formulation. All of these factors can influence the timing, characteristics, and foaming of the reactive mixture. Although a number of acids in varying molarity may be suitable for use in the present invention, a simple method to control acid is by dilution with water which is well known in the art. Generally speaking, strong acids are not used to cure epoxide functional materials since the relatively rapid exothermic reaction or reactive mixture causes the curing polymer to char. The present invention reduces, and substantially prevents charring since heat is dissipated (i.e. less heat per volume) due to the foaming process. More specifically, heat build-up is reduced through the reaction of the acid with the resin component in at least two proposed manners. First, the acid which reacts with the resin component is unavailable in the curing reaction which effectively results in a dilution of the acid concentration relative to the polymerization reaction. Second, the gas which is generated in the blowing reaction diffuses heat from the exothermic curing reaction such that heat is dissipated more efficiently by the polymerizing resin. In the embodiment discussed above wherein the core comprises an encapsulated metal carbonate, the acid initiated hompolymerization of the epoxy component or epoxide functional material softens or melts the encapsulated coating or wax surrounding the core. The core is then exposed and released to react with the acid and releases carbon dioxide. The release of the carbon dioxide then creates the foaming process. At the same time, the reaction of the acid with the metal carbonate core begins to neutralize the acid component thereby slowing the reaction rate as the metal carbonate core is consumed in the reactive mixture. As stated above, the reaction rate of the metal carbonate and the acid can be further controlled and directed through the use of a core having: a varying melting point, a varying coating thickness within the core, a varying percentage of metal carbonate in the formulation, a varying size of metal carbonate particles, and a varying percentage of acid and type of acid used in the formulation, all of which can effect the timing, characteristics, and foaming of the reactive mixture.

The preferred acid in the present invention is one which is capable of reacting with the resin component to promote a polymerization reaction that results in a controlled curing of the resin and which simultaneously reacts with the metal carbonate to liberate a blowing gas. In this regard, phosphoric acid (e.g., orthophosphoric acid; $H_3PO_4$) is most preferred. Other organic or inorganic acids may also be employed as well. Most preferably, the acid component of the composition of the present invention is a liquid, but may be found in other forms. The strength of the acid in Molarity is preferably from about 10 to about 14.7M and more preferably from about 12 to about 14.7M. Although water can be used to dilute and control acid strength for purposes of controlling the latent period, it is desirable in some applications to minimize the quantity of water present in the acid component since water may decrease the reaction rate and may produce a product with lower cohesive strength. Accordingly, it is preferred that concentrated acids be used in the present invention. The quantity of phosphoric acid in the acid component of the present invention is preferably from about 1 to about 25% by weight and more preferably from about 5 to about 15% by weight. Since the acid component may not become part of the polymer network once cured, it is desirable to minimize the amount of acid used to the extent possible. In addition, although not required in the present invention, it is contemplated that the acid component of the present invention may also comprise and be mixed with an inert material such as carbon black powder or a thixotropic material such as an aramid pulp which may improve shear-thinning characteristics. Another inert material which may be used in the present invention is ceramic microspheres having a size range of from about 25 to 500 microns. This embodiment, with the acid component premixed to form a paste, may be preferable in some materials handling environments.

In an alternative embodiment of the present invention, the second or acid component may further comprise a curing agent or curative agent as more particularly set forth in commonly assigned and co-pending U.S. patent application for a Two-Component (Epoxy/Amine Structural Foam-In-Place Material filed May 2, 2001 hereby expressly incorporated by reference. Additive(s)

Further, the present invention comprises the formulation of additional additive component(s), which will cause both the first and second components, described above to be shear thinning to enhance processing attributes of the material. In addition, the additives described herein may also comprise a third component of the formulation of the present invention. One such additive component of the present invention may include a filler. Typically, fillers are added to epoxy foam formulations to lower cost, add color, reduce exotherms, and control shrinkage rates. Fillers in the form of fine particles (for example, carbon black or fumed silica) may also serve as nucleating agents. Small particles provide sites for heterogeneous nucleation, which allow for initiation and subsequent growth of foam cells when certain blowing agent types' are used. In heterogeneous nucleation, gas molecules driven by supersaturation preferentially form nucleation sites on the solid/fluid interfaces of the nucleating agent. The ultimate cell size is determined by other factors including the exotherm, the rate of cure, the amount of blowing agent, and interactions between the epoxy and other formulation components. Although a number of suitable additives are known in the art and discussed in commonly-assigned U.S. Pat. No. 5,648,401, incorporated by reference, a particular preferred additive of the present invention is a thixotropic additive or filler formulated within either or potentially both of the first and second components which causes both components to be shear-thinning. An example of such a thixotropic filler is an aramid pulp and is sold under the trade name Kevlar 1F543. When such an additive is used with the present invention, the thixotropic additive is formulated in at least one, and preferably both the first or epoxy component and the second or acid component, but can also comprise a third component. In addition, it has been found that expansion and cure can be controlled through filler (metal carbonate) particle size in the present invention and that particle size of the filler can range from 1 to 20 microns. Total filler surface area is a function of filler quantity and filler particle size; total filler surface area determines the amount of filler available to react with the acid curing agent. In the present invention, it is preferred that the size of the filler particle be used rather than the quantity of filler to provide the total desired surface area. Although the present invention does not require the use of a filler in either component, other suitable fillers which may be used in the present invention are additional metal carbonates such as calcium carbonate, nickel and barium; metal bicarbonates such as sodium bicarbonate, and potassium bicarbonate. Although optional, most preferred for use are the metal carbonates and metal bicarbonates and particularly preferred is calcium carbonate and anhydrous sodium bicarbonate. Such an optional filler is sold by Global Stone Corp. under the name GPR325 and comprises particles of calcium carbonate approximately 14 microns in diameter. In a particularly preferred embodiment, the thixoptropic filler is formulated in at least one, and potentially both the first or epoxy component and the second or acid component. This additive effectuates shear thinning or an increased viscosity at a zero shear rate and a decreased viscosity at a higher shear rate.

Still further, a number of other additives can be utilized in the present invention such as carbon black, solid rubber particles, hollow microspheres, and inert polymer particles, if desired in a particular application. For example, hollow glass microspheres may be added to reduce the density of the foam while maintaining good strength and stiffness. Commercially available hollow glass microspheres (sometimes also referred to as glass microballoons or microbubbles) include materials sold by Minnesota Mining & Manufacturing under the trademark SCOTCHLITE, with suitable grades including those available under the designations B38, C15, K20, and VS 5500. The glass microspheres preferably have diameters in the range of from about 5 to 200 micrometers. The crush strength of the hollow glass microspheres may be selected in accordance with the desired characteristics of the cured thermoset foam or chosen reinforced structural member containing such foam. Glass fiber or another Fibrous reinforcement material is another alternative type of glass filler, since it helps increase the strength and stiffness of the standard reinforcement foam. The glass fiber may be chopped, milled, or in other suitable physical form. Other types of fillers may also optionally be present in the foamable composition. Any of the conventional organic or inorganic fillers known in the thermosettable resin art may be used including, for example, silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), fibers other than glass fibers (e.g., wollastinite gibers, carbon fibers, ceramic fibers, aramid fibers), alumina, clays, sand, metals (e.g. aluminum powder), microspheres other than glass microspheres such as ceramic microspheres, thermoplastic resin microspheres, thermoset rein microspheres, and carbon microspheres (all of which may be solid or hollow, expanded or expandable) and the like.

Other optional additives or components which could be utilized in alternative embodiments or formulations of the present invention include diluents (reactive or non-reactive) such as glycidyl ethers, glycidyl esters, acrylics, solvents and plasticizers, toughening or flexibilizing agents (e.g., aliphatic diepoxides, polyaminoamides, liquid polysulfide polymers, rubbers including liquid nitrile rubbers such as butadiene-acrylonitile copolymers, which may be functionalized with carboxy groups, amine groups or the like), coupling agents/wetting agents/adhesion promoters (e.g., silanes), colorants (e.g., dyes and pigments such as carbon black), stabilizers (e.g., antioxidants, UV stabilizers) and the like. In this regard, the preferred formulation set forth below may utilize these additional components such as an optional coloring agent, reinforcements and fillers. The following table I sets forth the preferred and most preferred ranges in percent by weight for the components of the composition of the present invention in one preferred formulation:

| First Component (Epoxy) | (weight %) | Second Component (Acid) | (weight %) |
|---|---|---|---|
| Cardolite NC-514 | 30–90% | Phosphoric Acid | 100% |
| Filler | 0–5% | | |
| Expancel | 0–5% | | |
| Kevlar | 0–5% | | |

In the method of the present invention, the first or resin component having the encapsulated metal carbonate core and the second or acid component are combined, preferably in liquid form. For example, the materials can be admixed either statically or dynamically with the mixture then placed in a cavity, the cavity can be an automotive body cavity or any cavity that could be structurally reinforced or derive acoustic or sealing benefit from a foam-in-place material. Alternatively, atomized streams of the separate materials can be impinged into a cavity. The encapsulated core and the resin are preferably premixed and the acid added just prior to application. In those applications where the acid is also premixed with an inert filler, the volumetric mix in this preferred premix step is preferably from about 1-1 to 20-1 (resin/filler-to-acid/inert material). Once mixed, the composition cures at room temperature (that is, without adding external heat) and the reaction of the acid with the filler evolves gas, which foams the resin. The present invention may be used in any of a number of different applications. In a preferred embodiment, it is applied to a substrate (e.g., a molded or extruded plastic or metal). In a particularly preferred embodiment, it is applied to member or panel for assembly onto an automotive vehicle, an appliance or furniture.

Thus it is apparent that there has been provided in accordance with the invention a method and apparatus that fully satisfy the objects, aims and advantages set forth above. While the invention has been described in connection with specific embodiments thereof it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. A method for producing a foamed article, comprising the steps of:
   providing an epoxy resin formulation, said formulation comprising a pre-mixed epoxy resin and an encapsulated metal salt core;
   providing an acid; and
   combining said resin formulation and said acid to form a reactive mixture and allowing said acid to catalyze polymerization of said resin formulation and react with said coated particulate to generate a blowing gas to form voids in said polymerized epoxy resin.

2. The method for producing a foamed article recited in claim 1, wherein said acid comprises phosphoric acid.

3. The method for producing a foamed article recited in claim 1, wherein said metal carbonate particulate comprises calcium carbonate coated with meltable solid.

4. A method for producing a foamed article, comprising the steps of:
   providing an epoxy resin formulation, said formulation having an epoxy resin and an encapsulated metal carbonate core;
   providing phosphoric acid; and
   combining said resin formulation and said phosphoric acid to form a reactive mixture and allowing said phosphoric acid to catalyze polymerization of said resin formulation and react with said metal carbonate core to generate a blowing gas to form voids in said polymerized epoxy resin.

5. The method for producing a foamed article recited in claim 4, wherein said resin formulation comprises from about 35% to about 95% by weight of said reactive mixture.

6. The method for producing a foamed article recited in claim 4, further comprising the steps of combining an additive with said reactive mixture.

7. The method for producing a foamed article recited in claim 4, wherein said phosphoric acid comprises from about 1 to about 15% by weight of said reactive mixture.

8. The method for producing a foamed article recited in claim 6, wherein said filler is selected form the group consisting of thixotropic fillers, metal carbonates and metal bicarbonates.

9. The method for producing a foamed article recited in claim 4 wherein said epoxy resin and said encapsulated metal carbonate core are combined prior to adding said phosphoric acid.

10. The method for producing a foamed article recited in claim 9, further including the step of combining said phosphoric acid with an inert filler prior to combining said phosphoric acid with said epoxy resin and said encapsulated metal carbonate core.

11. The method for producing a foamed article recited in claim 4, wherein the molarity of said phosphoric acid is from about 10 to about 14.7.

12. The method for producing a foamed article recited in claim 4, wherein said reactive mixture further includes an additive selected form the group consisting of carbon black, ceramic microspheres, thixotropic fillers, polymer particles, rubber particles, ceramic particles, inert mineral particles and combinations thereof.

13. A method for producing a foamed article, comprising the steps of:
   providing an epoxy resin;
   providing a metal carbonate core encapsulated by a meltable solid;
   combining said epoxy resin and said metal carbonate core encapsulated by a polymer to form an epoxy-based formulation;
   providing phosphoric acid;
   combining said epoxy-based formulation and said phosphoric acid to form a reactive mixture and allowing said phosphoric acid to catalyze polymerization of said epoxy-based formulation and react with said metal carbonate core to generate a blowing gas to form voids in said polymerized epoxy resin.

14. The method for producing a foamed article recited in claim 13, wherein said metal carbonate core comprises calcium carbonate.

15. The method for producing a foamed article recited in claim 3, wherein the meltable solid is selected from the group consisting of a wax and a polymer.

16. The method for producing a foamed article recited in claim 4, wherein the encapsulated metal carbonate core includes a meltable solid selected from the group consisting of a wax and a polymer.

17. The method for producing a foamed article recited in claim 13, wherein the meltable solid is selected from the group consisting of a wax and a polymer.

* * * * *